United States Patent
Park et al.

(10) Patent No.: US 9,350,183 B2
(45) Date of Patent: May 24, 2016

(54) MOBILE TERMINAL

(71) Applicant: LG ELECTRONICS INC., Seoul (KR)

(72) Inventors: Sekwon Park, Geyonggi-Do (KR); Kiwon Han, Gyeonggi-Do (KR); Janggeun Oh, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/700,242

(22) Filed: Apr. 30, 2015

(65) Prior Publication Data

US 2015/0236539 A1     Aug. 20, 2015

Related U.S. Application Data

(63) Continuation of application No. 13/325,636, filed on Dec. 14, 2011, now Pat. No. 9,035,600.

(30) Foreign Application Priority Data

Dec. 28, 2010 (KR) .......................... 10-2010-0137183

(51) Int. Cl.
*H02J 7/00* (2006.01)
*H01F 38/00* (2006.01)
*H04B 1/38* (2015.01)
(Continued)

(52) U.S. Cl.
CPC .............. *H02J 7/0044* (2013.01); *H02J 7/0052* (2013.01); *H02J 7/025* (2013.01); *H04B 1/3883* (2013.01)

(58) Field of Classification Search
CPC ......... H02J 7/025; H02J 7/0044; H01F 38/14; H04B 5/0037; H04B 5/0031
USPC ............................ 320/108; 307/104; 455/573
See application file for complete search history.

(56) References Cited

U.S. PATENT DOCUMENTS

| 5,541,491 A | * | 7/1996 | Yamazaki | ............. | H02J 7/0091 320/145 |
|---|---|---|---|---|---|
| 7,495,414 B2 | | 2/2009 | Hui | | |
| 8,035,255 B2 | | 10/2011 | Kurs et al. | | |

(Continued)

FOREIGN PATENT DOCUMENTS

| CN | 101228678 | 7/2008 |
|---|---|---|
| CN | 101459981 | 6/2009 |

(Continued)

OTHER PUBLICATIONS

European Search Report dated Apr. 17, 2012 issued in Application 11192798.4.

(Continued)

*Primary Examiner* — M'Baye Diao
(74) *Attorney, Agent, or Firm* — Ked & Associates LLP

(57) ABSTRACT

A mobile terminal is provided that includes a body to be mountable to a first charging apparatus, a current generator to generate an induction current by using a current of the first charging apparatus, and a wireless charger between the current generator and the battery to charge the battery by converting the induction current into a direct current. The mobile terminal may also include a connection port to be electrically connected to the battery and being connectable to a power supply terminal of a second charging apparatus, and a power charging controller to disconnect an electrically connected status between the wireless charger and the battery when the power supply terminal is electrically connected to the connection port.

10 Claims, 10 Drawing Sheets

(51) Int. Cl.
*H02J 7/02* (2016.01)
*H04B 1/3883* (2015.01)

(56) References Cited

U.S. PATENT DOCUMENTS

| | | | |
|---|---|---|---|
| 2004/0056779 A1 | 3/2004 | Rast | |
| 2006/0001382 A1 | 1/2006 | Nomoto | |
| 2006/0103355 A1 | 5/2006 | Patino et al. | |
| 2007/0096691 A1 | 5/2007 | Duncan et al. | |
| 2008/0218130 A1* | 9/2008 | Guo | H01M 10/441 320/162 |
| 2008/0258679 A1* | 10/2008 | Manico | H02J 7/025 320/106 |
| 2009/0140691 A1 | 6/2009 | Jung | |
| 2009/0146608 A1 | 6/2009 | Lee | |
| 2009/0156268 A1 | 6/2009 | Kim et al. | |
| 2010/0039066 A1* | 2/2010 | Yuan | H02J 7/025 320/108 |
| 2010/0141839 A1* | 6/2010 | Supran | G06F 1/1632 348/553 |
| 2011/0050164 A1 | 3/2011 | Partovi et al. | |
| 2011/0136550 A1* | 6/2011 | Maugars | H02J 7/025 455/573 |
| 2011/0156636 A1 | 6/2011 | Kim | |

FOREIGN PATENT DOCUMENTS

| | | |
|---|---|---|
| GB | 2353186 | 2/2001 |
| TW | 201037939 | 10/2010 |
| WO | WO 2007/012272 | 2/2007 |
| WO | WO 2010/129369 | 11/2010 |

OTHER PUBLICATIONS

Chinese Office Action dated Nov. 29, 2013 issued in Application 201110446372.3.

U.S. Office Action dated May 16, 2014 issued in U.S. Appl. No. 13/325,636.

U.S. Notice of Allowance dated Jan. 16, 2015 issued in U.S. Appl. No. 13/325,636.

* cited by examiner

MOBILE TERMINAL

CROSS-REFERENCE TO RELATED APPLICATIONS

This application is a Continuation application of U.S. application Ser. No. 13/325,636, filed Dec. 14, 2011, which claims priority under 35 U.S.C. §119 to Korean Application No. 10-2010-0137183, filed Dec. 28, 2010, the subject matters of which are hereby incorporated by reference.

BACKGROUND

1. Field

Embodiments may relate to a mobile terminal that charges a battery in a wired manner or in a wireless manner.

2. Background

A terminal may be a mobile (portable) terminal or a stationary terminal based on a moveable state. The mobile terminal may also be a handheld terminal or a vehicle mount terminal based on a user's carriage method.

The terminal may support complicated functions such as capturing images or video, reproducing music or video files, playing games, receiving broadcast signals, and/or the like. By comprehensively and collectively implementing such functions, the mobile terminal may be embodied in the form of a multimedia player. Attempts have been made to implement complicated functions by means of hardware or software.

BRIEF DESCRIPTION OF THE DRAWINGS

Arrangements and embodiments may be described in detail with reference to the following drawings in which like reference numerals refer to like elements and wherein.

DETAILED DESCRIPTION

Description may be provided in detail of exemplary embodiments, with reference to accompanying drawings. For ease of description with reference to the drawings, same or equivalent components may be provided with the same reference numbers, and a description thereof may not be repeated.

A mobile terminal may include a portable phone, a smart phone, a laptop computer, a digital broadcasting terminal, Personal Digital Assistants (PDA), Portable Multimedia Player (PMP), a navigation system, and/or etc.

Figure 1:
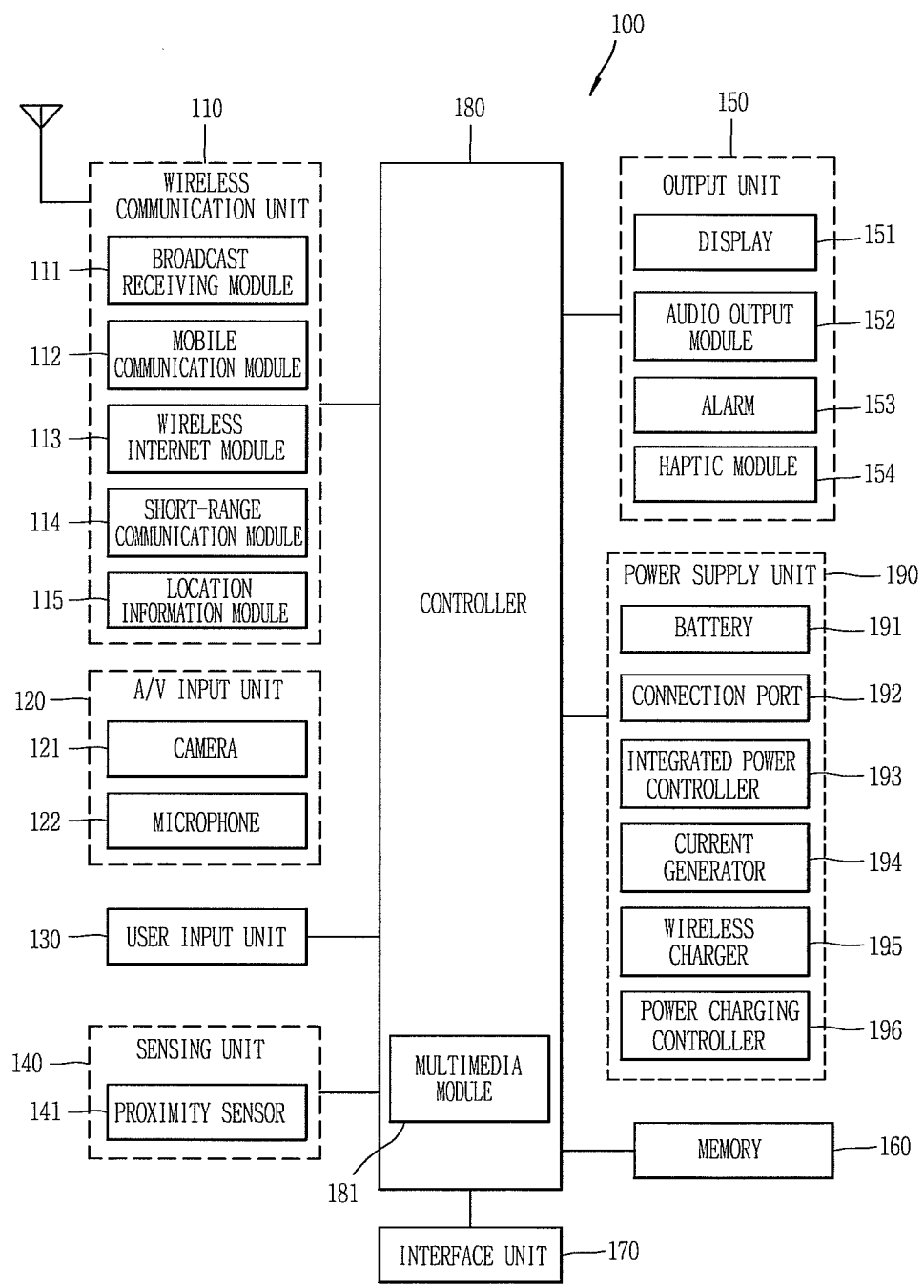
FIG. 1 is a block diagram of a mobile terminal according to an embodiment.

FIG. 1 is a block diagram of a mobile terminal according to an embodiment. Other embodiments and configurations may also be provided.

The mobile terminal 100 may include components, such as a wireless communication unit 110, an Audio/Video (A/V) input unit 120, a user input unit 130, a sensing unit 140, an output module 150, a memory 160, an interface unit 170, a controller 180, a power supply unit 190 and/or the like. FIG. 1 shows the mobile terminal 100 having various components, although it is understood that implementing all of the illustrated components is not a requirement. Greater or fewer components may alternatively be implemented.

The wireless communication unit 110 may include one or more components that permit wireless communications between the mobile terminal 100 and a wireless communication system, or between the mobile terminal 100 and a network within which the mobile terminal 100 is located. For example, the wireless communication unit 110 may include a broadcast receiving module 111, a mobile communication module 112, a wireless internet module 113, a short-range communication module 114, a location information module 115 (or position information module) and/or the like.

The broadcast receiving module 111 may receive a broadcast signal and/or broadcast associated information from an external broadcast managing entity via a broadcast channel.

The broadcast channel may include a satellite channel and a terrestrial channel. The broadcast managing entity may indicate a server that generates and transmits a broadcast signal and/or broadcast associated information or a server that receives a pre-generated broadcast signal and/or broadcast associated information and sends them to the mobile terminal. The broadcast signal may be implemented as a TV broadcast signal, a radio broadcast signal, and/or a data broadcast signal, for example. The broadcast signal may further include a data broadcast signal combined with a TV or a radio broadcast signal.

The broadcast associated information may indicate information relating to broadcast channels, broadcast programs or broadcast service providers. Further, the broadcast associated information may be provided via a mobile communication network and may be received by the mobile communication module 112.

The broadcast associated information may be implemented in various formats. For example, broadcast associated information may include an Electronic Program Guide (EPG) of Digital Multimedia Broadcasting (DMB), Electronic Service Guide (ESG) of Digital Video Broadcast-Handheld (DVB-H), and/or the like.

The broadcast receiving module 111 may receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and/or the like. The broadcast receiving module 111 may be suitable for a broadcast system that transmits broadcast signals as well as the digital broadcasting systems.

Broadcast signals and/or broadcast associated information received via the broadcast receiving module 111 may be stored in a suitable device, such as a memory 160.

The mobile communication module 112 may transmit/receive wireless signals to/from at least one of network entities (e.g., base station, an external terminal, a server, etc.) on a mobile communication network. The wireless signals may include an audio call signal, a video call signal, and/or various formats of data according to transmission/reception of text/multimedia messages.

The wireless internet module 113 may support wireless Internet access for the mobile terminal 100. This wireless internet module 113 may be internally or externally coupled to the mobile terminal 100. Examples of the wireless Internet access may include Wireless LAN (WLAN) (Wi-Fi), Wireless Broadband (Wibro), World Interoperability for Microwave Access (Wimax), High Speed Downlink Packet Access (HSDPA) and/or the like.

The short-range communication module 114 may denote a module for short-range communications. Suitable technologies for implementing the short-range communication module 114 may include BLUETOOTH, Radio Frequency IDentification (RFID), Infrared Data Association (IrDA), Ultra-WideBand (UWB), ZigBee and/or the like.

The location information module 115 may be a module for detecting or calculating a position of a mobile terminal. An example of the location information module 115 may include a Global Position System (GPS) module.

The A/V input unit 120 may provide audio or video signal input to the mobile terminal 100. The A/V input unit 120 may include a camera 121 and a microphone 122. The camera 121 may receive and process image frames of still pictures or video obtained by image sensors in a video (telephony) call mode or a capturing mode. The processed image frames may be displayed on a display 151.

The image frames processed by the camera 121 may be stored in the memory 160 or may be transmitted to an exterior via the wireless communication unit 110. Two or more cameras 121 may be provided based on a use environment of the mobile terminal 100.

The microphone 122 may receive an external audio signal while the mobile terminal 100 is in a particular mode, such as a phone call mode, a recording mode, a voice recognition mode and/or the like. This audio signal may be processed into digital data. The processed digital data may be converted for output into a format transmittable to a mobile communication base station via the mobile communication module 112 in case of the phone call mode. The microphone 122 may include assorted noise removing algorithms to remove noise (or cancel noise) generated in the course of receiving the external audio signal.

The user input unit 130 may generate input data input by a user to control operations of the mobile terminal 100. The user input unit 130 may include a keypad, a dome switch, a touchpad (e.g., static pressure/capacitance), a jog wheel, a jog switch and/or the like. When the touch pad has a layered structure with the display 151, this may be referred to as a touch screen.

The sensing unit 140 may provide status measurements of various aspects of the mobile terminal 100. For example, the sensing unit 140 may detect an open/close status of the mobile terminal 100, a change in a location of the mobile terminal 100, a presence or absence of user contact with the mobile terminal 100, an orientation of the mobile terminal 100, acceleration/deceleration of the mobile terminal 100 and/or the like, so as to generate a sensing signal for controlling operations of the mobile terminal 100. For example, regarding a slide-type mobile terminal, the sensing unit 140 may sense whether a sliding portion of the mobile terminal 100 is open or closed. Other examples include sensing functions, such as the sensing unit 140 sensing presence or absence of power provided by the power supply unit 190, presence or the absence of a coupling or other connection between the interface unit 170 and an external device and/or the like. The sensing unit 140 may include a proximity sensor 141 that will be described below in relation to a touch screen.

The output unit 150 may output an audio signal, a video signal and/or an alarm signal. The output unit 150 may include a display 151, an audio output module 152, an alarm 153, a haptic module 154 and/or the like.

The display 151 may output information processed in the mobile terminal 100. For example, when the mobile terminal 100 is operating in a phone call mode, the display 151 may provide a User Interface (UI) or a Graphic User Interface (GUI) that includes information associated with the call. As another example, if the mobile terminal 100 is in a video call mode or a capturing mode, the display 151 may additionally or alternatively display images captured and/or received.

The display 151 may include at least one of a Liquid Crystal Display (LCD), a Thin Film Transistor-Liquid Crystal Display (TFT-LCD), an Organic Light-Emitting Diode (OLED), a flexible display and/or a three-dimensional (3D) display.

Some of the displays may be transparent such that it is possible to see the exterior therethrough. These displays may be called transparent displays. A representative example of the transparent display may include a Transparent Organic Light Emitting Diode (TOLED) and/or the like. The rear surface portion of the display unit 151 may also be implemented to be optically transparent. Under this configuration, a user can view an object positioned at a rear side of a body through a region occupied by the display unit 151 of the body.

The display 151 may be implemented to include two or more displays according to a configured aspect of the mobile terminal 100. For example, a plurality of displays may be arranged on one surface integrally or separately and/or may be arranged on different surfaces.

If the display 151 and a touch sensitive sensor (referred to as a touch sensor) have a layered structure therebetween, the structure may be referred to as a touch screen. The display 151 may be used as an input device rather than an output device. The touch sensor may be implemented as a touch film, a touch sheet, a touch pad and/or the like.

The touch sensor may convert changes of a pressure applied to a specific part of the display 151, or a capacitance occurring from a specific part of the display 151, into electric input signals. The touch sensor may sense not only a touched position and a touched area, but also a touched pressure.

When touch inputs are sensed by the touch sensors, corresponding signals may be transmitted to a touch controller. The touch controller may process the received signals, and then transmit corresponding data to the controller 180. Accordingly, the controller 180 may sense which region of the display 151 has been touched.

A proximity sensor 141 may be provided at an inner region of the mobile terminal 100 covered by the touch screen, or near the touch screen. The proximity sensor 141 may sense presence or absence of an object approaching a surface to be sensed, or an object disposed near a surface to be sensed, by using an electromagnetic field or infrared rays without a mechanical contact. The proximity sensor 141 may have a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared ray proximity sensor and/or so on. When the touch screen is implemented as a capacitance type, proximity of a pointer to the touch screen may be sensed by changes of an electromagnetic field. In this example, the touch screen (or touch sensor) may be categorized as a proximity sensor.

Accordingly, if the pointer is in proximity to the touch screen without contacting the touch screen, a position of the pointer and a distance between the pointer and the touch screen may be detected. Hereinafter, for ease of explanation, a status that the pointer is positioned to be proximate to the touch screen without contact may be referred to as a proximity touch, whereas a status that the pointer substantially comes in contact with the touch screen may be referred to as a contact touch. For the position corresponding to the proximity touch of the pointer on the touch screen, such position may correspond to a position where the pointer faces perpendicular to the touch screen upon the proximity touch of the pointer.

The proximity sensor 141 may sense a proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode and/or so on. The audio output module 152 may output audio signals relating to functions performed in the mobile terminal 100 (e.g., sound alarming a call received or a message received and so on). The audio output module 152 may include a receiver, a speaker, a buzzer and/or so on.

The alarm 153 may output signals notifying occurrence of events from the mobile terminal 100. The events occurring from the mobile terminal 100 may include a call received, a message received, a key signal input, a touch input and/or so on. The alarm 153 may output not only video or audio signals, but also other types of signals such as signals notifying occurrence of events in a vibration manner. For example, the alarm 153 may vibrate in response to the mobile terminal 100 receiving a call or message. As another example, when a key signal has been inputted, the alarm 153 may output vibration as a feedback of the key signal input. Through this vibration output, a user may recognize the occurrence of an event. In order to output a signal in a vibration manner, the mobile terminal 100 may include a vibrator. The video signal or the audio signal may be outputted through the display 151 or the audio output module 152.

The haptic module 154 may generate various tactile effects that a user may feel. A representative example of the tactile effects generated by the haptic module 154 may include vibration. Vibration generated by the haptic module 154 may have a controllable intensity, a controllable pattern and/or so on. For example, different vibration may be output in a synthesized manner or in a sequential manner.

The haptic module 154 may generate various tactile effects including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and/or the like.

The haptic module 154 may transmit tactile effects (signals) through a user's direct contact, or a user's muscular sense using a finger or a hand. The haptic module 154 may be implemented into two or more haptic modules according to the configuration of the mobile terminal 100.

The memory 160 may store a program for processing and control of the controller 180. The memory 160 may temporarily store input/output data (e.g., phonebook data, messages, still images, video and/or the like). The memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk and/or the like. The mobile terminal 100 may operate a web storage that performs a storage function of the memory 160 on the Internet.

The interface unit 170 may interface the mobile terminal 100 with external devices. The interface unit 170 may allow a data reception from an external device, a power delivery to each component in the mobile terminal 100, and/or a data transmission from the mobile terminal 100 to an external device. The interface unit 170 may include wired/wireless headset ports, external charger ports, wired/wireless data ports, memory card ports, ports for coupling devices having an identification module, audio Input/Output (I/O) ports, video I/O ports, earphone ports and/or the like, for example.

The identification module may be a chip for storing various information required to authenticate an authority to use the mobile terminal 100, which may include a User Identity Module (UIM), a Subscriber Identity Module (SIM), a Universal Subscriber Identity Module (USIM) and/or the like. The device having the identification module (hereinafter referred to as an identification device) may be implemented as a type of smart card. The identification device may be coupled to the mobile terminal 100 via a port.

The interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 may control overall operations of the mobile terminal 100. For example, the controller 180 may perform control and processing associated with telephony calls, data communications, video calls and/or the like. The controller 180 may include a multimedia module 181 that provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 may serve to supply power to each component by receiving external power or internal power under control of the controller 180. For example, the power supply unit 190 may include a battery 191, a connection port 192 and an integrated power controller 193.

For example, the battery 191 may be implemented as a built-in battery configured to be chargeable, and/or may be detachably coupled to a terminal body for charging, etc.

The connection port 192 may be configured as one example of the interface unit 170 to which an external charger for supplying power for battery charging is electrically connected. When the mobile terminal 100 is connected to a charger, the connection port 192 may serve as a passage through which power from the charger is supplied to the mobile terminal 100. Alternatively, the connection port 192 may serve as a passage through which each type of command signals input from the charger by a user are transmitted to the mobile terminal.

The integrated power controller 193 may supply power to main components of the mobile terminal 100, such as the controller 180, the memory 160 and the wireless communication unit 110, by being connected to the battery 191.

The power supply unit 190 may include a current generator 194 and a wireless charger 195 for wirelessly charging. The current generator 194 may generate an induction current by using a current of a wireless charging apparatus 310 of FIG. 3 (hereinafter referred to as a first charging apparatus). The wireless charger 195 may charge a battery by converting the induction current into a direct current.

A power charging controller 196 may control charging by the power supply unit 190. The power charging controller 196 may set wired charging and wireless charging.

Various embodiments may be implemented in a computer-readable medium using, for example, software, hardware, and/or some combination thereof.

For a hardware implementation, embodiments may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform functions described herein, and/or a selective combination thereof. In some examples, such embodiments may be implemented by the controller 180.

For software implementation, embodiments such as procedures and functions may be implemented together with separate software modules each of which may perform at least one of functions and operations. The software codes may be implemented with a software application written in any suitable programming language. The software codes may be stored in the memory 160 and executed by the controller 180.

Figure 2A:
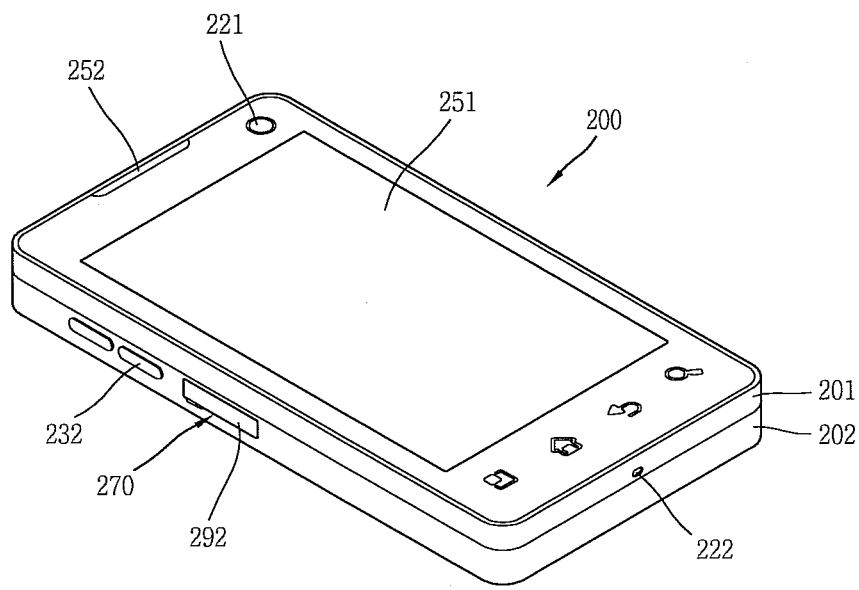
FIG. 2A is a front perspective view of a mobile terminal according to an embodiment.
Figure 2B:
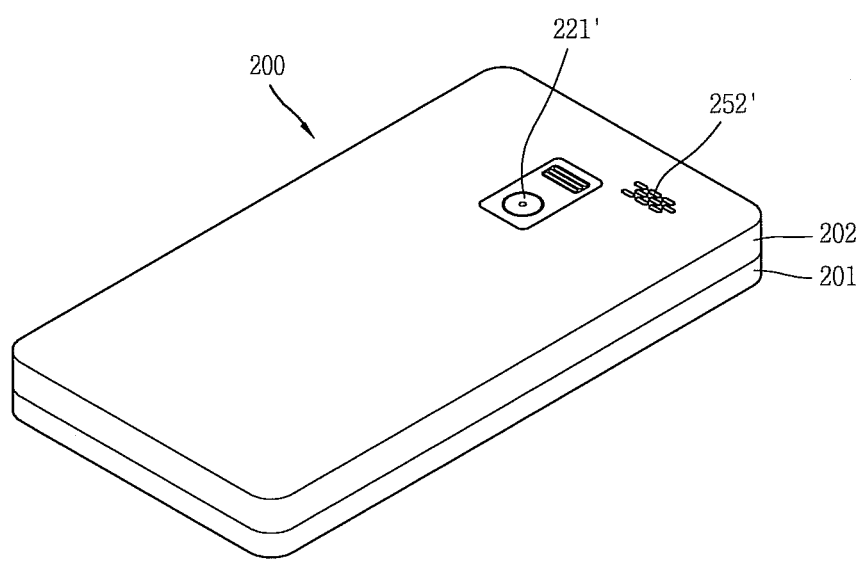
FIG. 2B is a rear perspective view of the mobile terminal of FIG. 2A.

FIG. 2A is a front perspective view of the mobile terminal 100 FIG. 2B is a rear perspective view of the mobile terminal of FIG. 2A.

As shown in FIGS. 2A and 2B, the mobile terminal 200 is a bar type mobile terminal. However, embodiments are not limited to this, but may be applied to a slide type in which two or more bodies are coupled to each other so as to perform a relative motion, a folder type (or a swing type), a swivel type and/or the like.

A case (casing, housing, cover, etc.) forming an outer appearance of a body may include a front case 201 and a rear case 202. A space formed by the front case 201 and the rear case 202 may accommodate various components therein. At least one intermediate case may further be provided between the front case 201 and the rear case 202.

Such cases may be formed by injection-molded synthetic resin, or may be formed using a metallic material such as stainless steel (STS) or titanium (Ti).

A display 251, an audio output unit 252, a camera 221, user input units 231 and 232, a microphone 222, an interface unit 270, etc. may be provided at the front case 201.

The display 251 may occupy most of a main surface of the front case 201. The audio output unit 252 and the camera 221 may be arranged at a region adjacent to one end of the display 251, and the user input unit 231 and the microphone 222 may be arranged at a region adjacent to another end of the display 251. The user input unit 232, the interface unit 270, etc. may be arranged on side surfaces of the front case 201 and the rear case 202.

The user input units 231 and 232 may be manipulated to receive a command for controlling the operation of the mobile terminal 200, and may include a plurality of manipulation units. The manipulation units may be referred to as manipulating portions, and may include any type of ones that may be manipulated in a user's tactile manner.

Commands inputted through the first or second user input units 231 and 232 may be variously set. For example, the first manipulation 231 may be configured to input commands such as START, END, SCROLL and/or the like, and the second manipulation unit 232 may input commands for controlling a level of sound outputted from the audio output unit 252, and/or commands for converting the current mode of the display 251 to a touch recognition mode. The display 251 may form a touch screen together with a touch sensor, and the touch screen may be one example of the user input unit 230.

Referring to FIG. 2B, a camera 221' may be additionally provided on the rear case 202. The camera 221' may face a direction that is opposite to a direction faced by the camera 221 (refer to FIG. 2A), and may have different pixels from those of the camera 221.

For example, the camera 221 may operate with relatively lower pixels (lower resolution). Thus, the camera 221 may be useful when a user can capture his face and send it to another party during a video call or the like. On the other hand, the camera 221' may operate with a relatively higher pixels (higher resolution) such that it may be useful for a user to obtain higher quality pictures for later use. The cameras 221 and 221' may be installed at the terminal body so as to rotate or pop-up.

A flash and a mirror may be additionally provided adjacent to the camera 221'. The flash may operate in conjunction with the camera 221' when taking a picture using the camera 221'. The mirror may cooperate with the camera 221' to allow a user to photograph himself in a self-portrait mode.

An audio output unit 252' may be additionally provided on a rear surface of the terminal body. The audio output unit 252' may cooperate with the audio output unit 252 (FIG. 2A) provided on a front surface of the terminal body so as to implement a stereo function. The audio output unit 252' may operate as a speakerphone.

A broadcast signal receiving antenna as well as an antenna for calling may be additionally provided on a side surface of the terminal body. The broadcast signal receiving antenna of the broadcast receiving module 111 may be configured to retract into the terminal body.

The rear case 202 may be further provided with a touch sensor for detecting a touched status. Like the display 251, the touch sensor may be formed to be transmissive. When the display 251 is configured to output visual information from two surfaces thereof, the visual information may be recognized through the touch sensor. The information outputted from the two surfaces may be controlled by the touch sensor. Differently from this, the touch sensor may be further provided with a display, and the touch screen may be arranged at the rear case 202.

Referring to FIG. 2A, an interface unit 270 may be provided on a side surface of the mobile terminal 200. The interface unit 270 may include a connection port 292 to which a power supply terminal 320 (FIG. 3) may be electrically connected. The power supply terminal 320 of a wired charging apparatus (hereinafter referred to as a second charging apparatus) may supply power for charging a battery 291 (FIG. 4).

When the mobile terminal 200 is connected to the second charging apparatus, the connection port 292 may serve as a passage through which power from the power supply terminal 320 of the second charging apparatus is supplied to the mobile terminal 200.

The mobile terminal 200 may undergo a wired charging and/or a wireless charging. For charging of the mobile terminal 200, a charging mechanism for charging based on priorities may be provided. The charging mechanism may be explained in more detail with reference to FIGS. 3 to 7.

Figure 3:
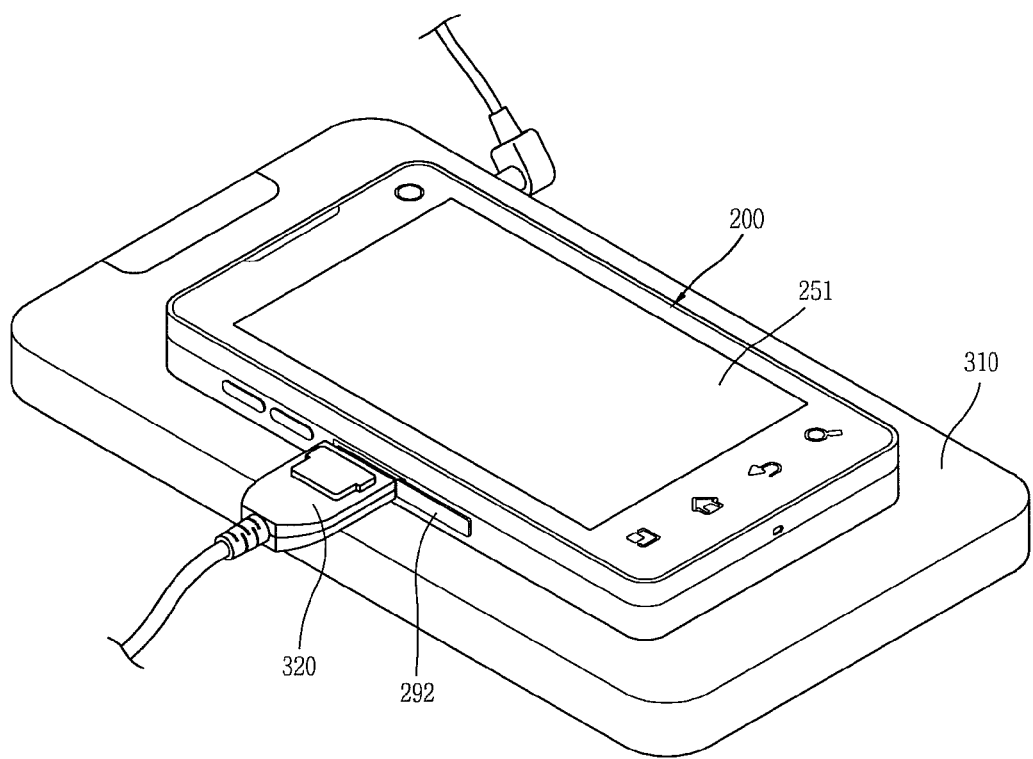
FIG. 3 is a perspective view illustrating a mobile terminal connected to first and second charging apparatuses.
Figure 4:
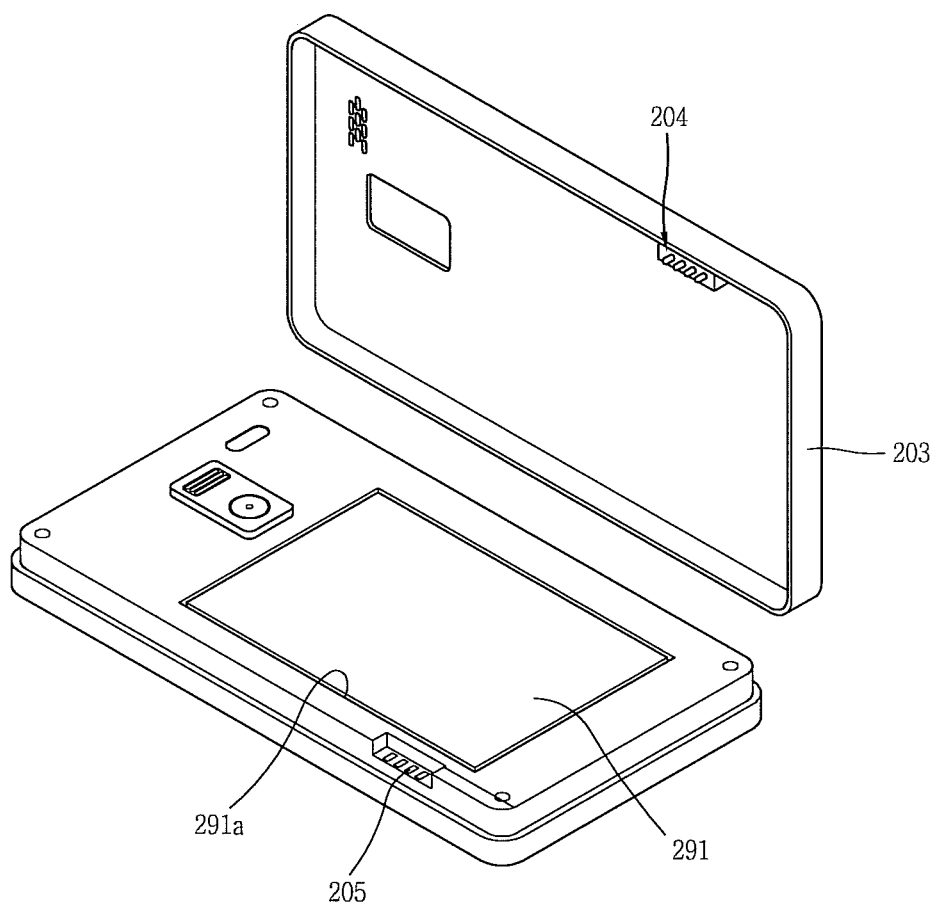
FIG. 4 is a disassembled perspective view of the mobile terminal of FIG. 2B.
Figure 5:
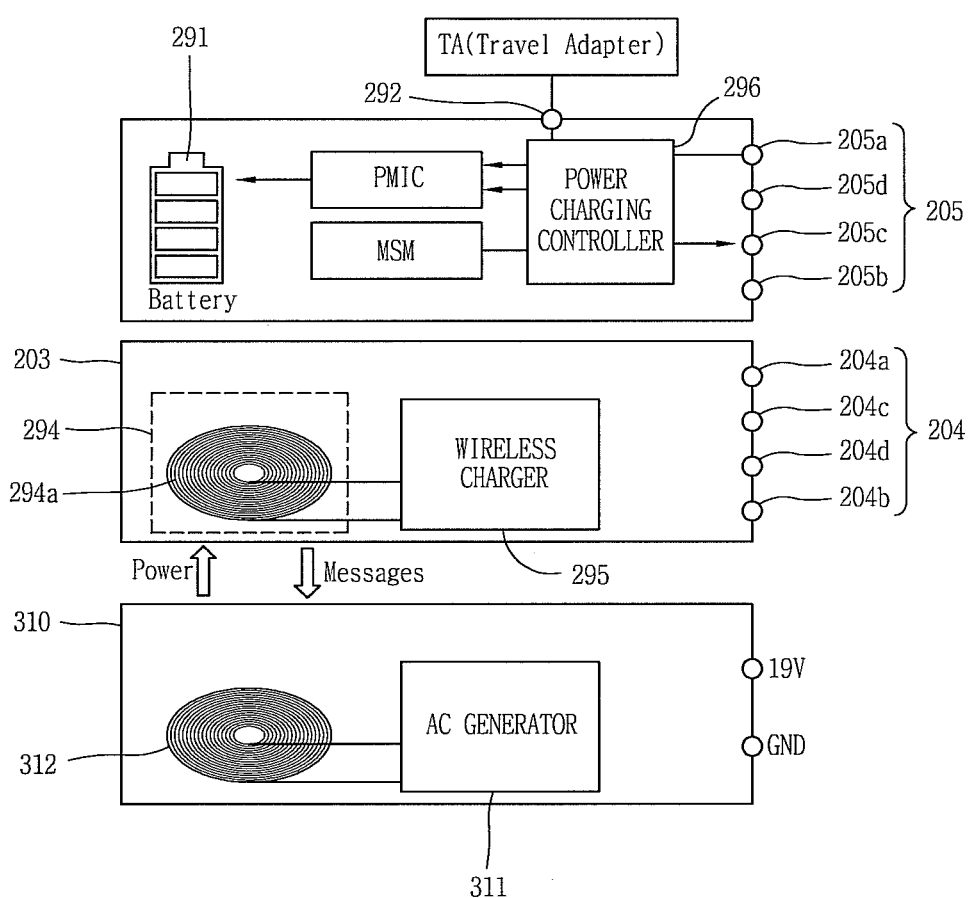
FIG. 5 is a block diagram illustrating wireless charging and wired charging of a mobile terminal.
Figure 6:
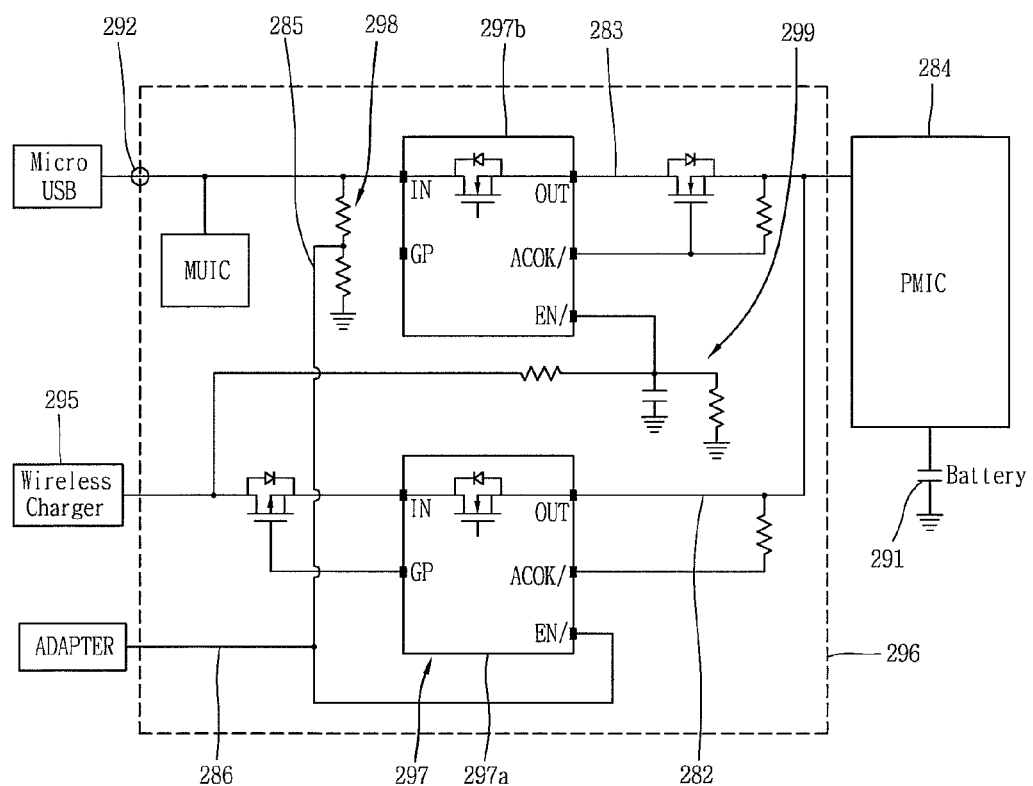
FIG. 6 is a circuit diagram of the mobile terminal of FIG. 4.
Figure 7:
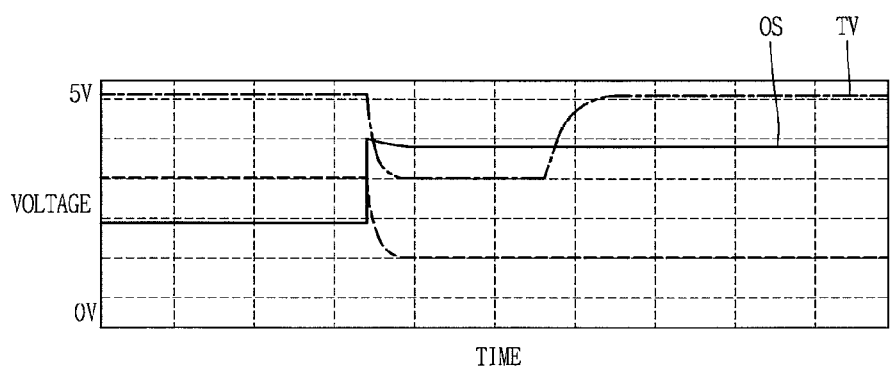
FIG. 7 is a graph of voltage charging of the mobile terminal of FIG. 4.

FIG. 3 is a perspective view illustrating a mobile terminal connected to first charging apparatus and a second charging apparatus. FIG. 4 is a disassembled perspective view of the mobile terminal (of FIG. 2B). FIG. 5 is a block diagram illustrating a wireless charging and a wired charging of a mobile terminal. FIG. 6 is a circuit diagram of the mobile terminal of FIG. 4. FIG. 7 is a graph of a voltage charging of the mobile terminal (of FIG. 4). Other embodiments and configurations may also be provided.

Referring to FIGS. 3 to 5, a mobile terminal 200 may be provided on the first charging apparatus 310, and may receive power for charging in a wireless manner. A body of the mobile terminal 200 may receive a battery 291, and the body may be provided on the first charging apparatus 310. The body of the mobile terminal 200 may receive power for charging by using an induction current.

As shown in FIG. 5, the first charging apparatus 310 may include an alternating current (AC) generator 311 and a primary coil 312. The AC generator 311 may be connected to the primary coil 312, and the AC generator 311 may generate an AC power. Once the AC power is applied to the primary coil 312, a peripheral magnetic field may be provided.

A current generator 294 may formed at the terminal body. The current generator 294 may generate an induction current based on a current of the first charging apparatus 310. The current generator 294 may be provided with a secondary coil 294a, and may generate an induction current by using an electromagnetic field of the primary coil 312.

The current generator 294 may be electrically connected to the wireless charger 295. The wireless charger 295 may be provided between the current generator 294 and the battery 291, and the wireless charger 295 may charge the battery 291 by converting an induction current into a direct current.

The current generator 294 and the wireless charger 295 may be provided at the mobile terminal. For example, as shown in FIG. 4, an accommodation space 291a for accommodating the battery 291 may be provided on one surface of the terminal body, and a cover 203 for covering the accommodation space 291a may be provided at the terminal body.

The battery 291 may be detachably coupled to the accommodation space 291a. A connection terminal for connecting to the battery 291 may be provided at the accommodation space 291a so as to supply power to at least one component of the mobile terminal. The cover 203 may be detachably coupled to the terminal body. However, embodiments are not limited to this arrangement. That is, the cover 203 may be attached to the terminal body.

At least one of the current generator 294 or the wireless charger 295 may be formed at the cover 203. Both the current generator 294 and the wireless charger 295 may be provided at the cover 203. However, only the current generator 294 may be formed at the cover 203 and the wireless charger 295 may be provided in the terminal body.

Once the current generator 294 and/or the wireless charger 295 are provided in the cover 203, a wireless charging may be performed when the cover 203 is provided to face the first charging apparatus 310. A user may view a current charging status on the display 251.

FIG. 4 shows that connection terminals 204 and 205 (i.e., a first set of connection terminals and a second set of connection terminals) corresponding to each other may be provided at the cover 203 and the body, so as to electrically connect at least one of the current generator 294 or the wireless charger 295 to the body when the cover 203 is provided to the body.

The connection terminals 204 and 205 may be 5V input terminals 204a and 205a, ground connection terminals 204b and 205b, and/or signal terminals 204c, 205c, 204d and 205d. The 5V input terminals 204a and 205a may supply a direct current of the wireless charger 295 to the body. The signal terminals may include the signal terminals 204c and 205c for transmitting a full charging signal, and the signal terminals 204d and 205d for transmitting a V-adapter signal.

The body side connection terminal 205 may be mounted to a circuit board provided in the case, and the circuit board may be electrically connected to the battery 291. The circuit board may be implemented as one example of the controller 180 for operating each function of the mobile terminal.

Electronic devices such as a display (or display device) may be mounted to the circuit board, and the electronic devices may receive power from the battery 291. Electronic devices for charging the battery 291 may be mounted to the circuit board, and may be electrically connected to connection terminals of the accommodation space 291a.

Referring to FIGS. 3 to 5, the connection port 292 provided on one surface of the terminal body may be connected to the power supply terminal 320 of the second charging apparatus, and may be electrically connected to the battery 291.

A power charging controller 296 may be provided at the terminal body (e.g., at the circuit board). The power charging controller 296 may disconnect an electrically connected status between the wireless charger 295 and the battery 291 when the power supply terminal 320 is connected to the connection port 292.

As shown in FIG. 6, the power charging controller 296 may include a switching unit 297 and a signal generating unit 298.

The switching unit 297 may change a first connection line 282 on or off between the wireless charger 295 and the battery 291. The switching unit 297 may connect or disconnect the first connection line 282. The first connection line 282 may be an electric wire that includes the wireless charger 295, the switching unit 297, a Power Management Integrated Circuit (PMIC) 284 and the battery 291.

The switching unit 297 may include a first overvoltage preventing circuit 297a to switch the first connection line 282 off (i.e., disconnect the first connection line 282) when an overvoltage is at the wireless charger 295. The first overvoltage preventing circuit 297a may be connected to the signal generating unit 298 so as to change the first connection line 282 off by an OFF signal.

The signal generating unit 298 may be provided on a second connection line 283 between the connection port 292 and the battery 291. The second connection line 283 may be an electric wire that includes the connection portion 292, the signal generating unit 298, the Power Management Integrated Circuit (PMIC) 284 and the battery 291. At the second connection line 283, a second overvoltage preventing circuit 297b may be provided for switching the second connection line 283 off (i.e., disconnect the second connection line 283) when an overvoltage is applied to the second connection line 283.

The signal generating unit 298 may transmit an OFF signal to the switching unit 297 when the power supply terminal 320

(FIG. 4) is connected to the connection port 292. More specifically, the signal generating unit 298 may generate an OFF signal when power is supplied to the connection port 292 through the power supply terminal 320.

Referring to FIG. 6, the signal generating unit 298 may have a plurality of resistances, and a signal connection line 285 may diverge between the resistances. Under this configuration, when receiving 5V from the connection port 292, the signal generating unit 298 may generate an OFF signal, such as 3.5V.

The signal connection line 285 may be connected to the first overvoltage preventing circuit 297a. For example, the signal connection line 285 may be connected to an Enable (EN) terminal of the first overvoltage preventing circuit 297a from the signal generating unit 298. As the first overvoltage preventing circuit 297a is operated by an OFF signal, an electrical connected status of the first connection line 282 may be disconnected (i.e., the first connection line 282 is switched off).

Once a wired charging is performed, a wireless charging may not be performed any longer. A charging mechanism may provide priorities to charging methods.

The power charging controller 296 may include a signal transmission line 286. The signal transmission line 286 may diverge from the signal connection line 285, and may be connected to the signal terminal 205d for transmitting an OFF signal to the first charging apparatus. Once the power supply terminal 320 is connected to the connection port 292, an OFF signal may be transmitted to the first charging apparatus 310 (FIG. 4) through the signal transmission line 286. Under this configuration, the first charging apparatus 310 may be turned off.

Referring to FIG. 6, the power charging controller 296 may include a delay circuit 299. The delay circuit 299 may delay a power supply through the second connection line 283 for a preset time when an OFF signal has been transmitted to the switching unit 297.

The delay circuit 299 may include an RC circuit, for example, and may be connected to the second overvoltage preventing circuit 297b. A voltage change may occur before and after the second connection line 283 starts to perform the power supply based on the delay circuit 299.

Referring to FIG. 7, when a wired charging starts to be performed during a wireless charging, the wireless charging may be stopped by an OFF signal (OS). As a result, a charging voltage of the first charging apparatus 310 may be lowered from '5V' to '0V'. If there is no delay circuit 299, a charging voltage of the second charging apparatus may change from '0V' to '5V'. Accordingly, a total charging voltage (TV) may be maintained as 5V. This may cause the mobile terminal to not precisely detect a connected status of the second charging apparatus.

If a time taken to change a charging voltage of the second charging apparatus into '5V' from '0V' is delayed by the delay circuit 299, a total charging voltage (TV) may change. Based on the change of the total charging voltage, the power charging controller 296 may detect a connected status of the power supply terminal 320 (of the second charging apparatus) to the connection port 292.

Based on the change of the total charging voltage, the power charging controller 296 may disconnect an electrically connected status of the first connection line 282 when the power supply terminal 320 is connected to the connection port 292, but may also maintain the electrically connected status of the first connection line 282 when a data supply terminal is connected to the connection port 292. The data supply terminal may be a USB and/or so on. In a status that a USB is connected to the mobile terminal, the wireless charging may be maintained.

A mechanism for implementing simultaneous charging according to an embodiment may now be provided.

Figure 8:
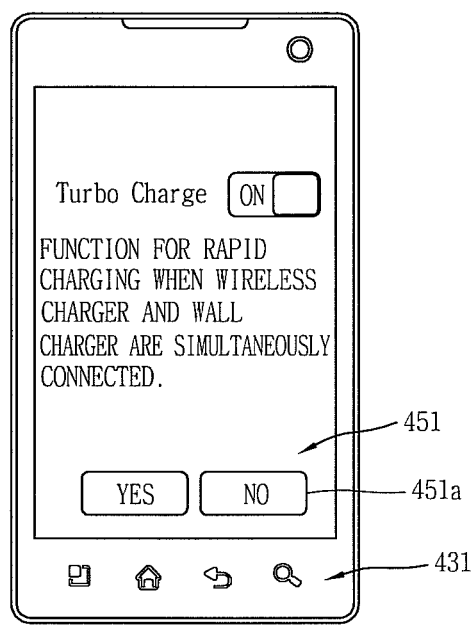
FIG. 8 is a view of a mobile terminal according to an embodiment.
Figure 9:
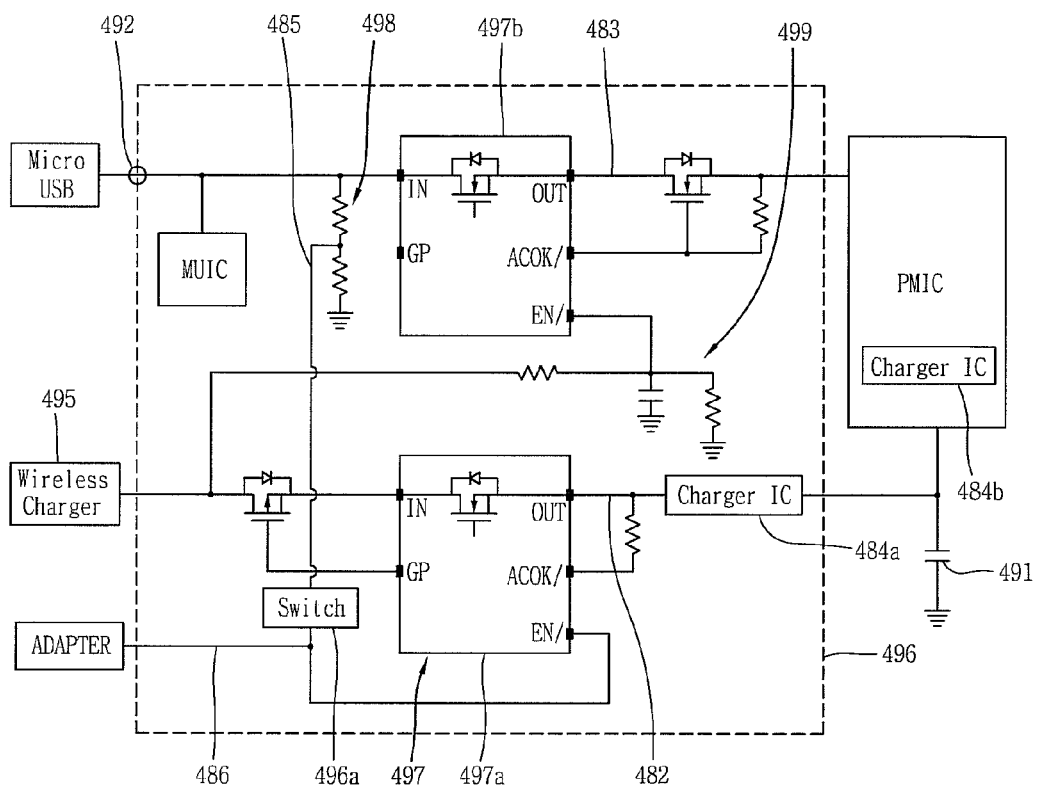
FIG. 9 is a circuit diagram of simultaneous charging of the mobile terminal of FIG. 8.

FIG. 8 is a view of a mobile terminal according to an embodiment. FIG. 9 is a circuit diagram of simultaneous charging of the mobile terminal of FIG. 8. Same configurations as discussed above with reference to FIGS. 3 to 7 may not be explained for ease of description. Other embodiments and configurations may also be provided.

FIG. 8 shows that a user input unit 431 for receiving a control command may be provided on a surface of the body. A selection window 451a for selecting the control command may pop-up on a display 451 when the power supply terminal 320 (of the second charging apparatus) is connected to the connection port 292. The display 451 may detect a touch input. The display 451 may also play a role of the user input unit 431.

An input control command may be a command for selecting simultaneous charging by the first charging apparatus and the second charging apparatus. High-speed charging may be implemented by a simultaneous charging. Visual information may be displayed on the selection window 451a for informing high-speed charging and a user's selection.

A user may select a single charging by the wired charging apparatus or simultaneous charging by the wired charging apparatus and the wireless charging apparatus. If a high-speed charging is not selected by the user, the mobile terminal may perform a single charging.

The mobile terminal may be preset to one of a simultaneous charging or a single charging. According to a user's manipulation, a display may display a menu window for selecting a simultaneous charging. Through the menu window, the user may select a simultaneous charge or not. That is, a single charging or a simultaneous charging may be set by the user.

Hardware for implementing both a single charging and a simultaneous charging may be explained with reference to FIG. 9.

FIG. 9 shows a power charging controller 496 that may be configured to be turned on/off by a control command so as to perform a simultaneous charging by the first charging apparatus and the second charging apparatus. The control command may be a command inputted by a user's selection as shown in FIG. 8.

Referring to FIG. 9, a first connection line 482 may include a wireless charger 495, a switching unit 497, a first charging integrated circuit 484a (Charger IC) and a battery 491. A second connection line 483 may include a connection port 492, a signal generating unit 498, a second charging integrated circuit 484b and the battery 491. The second charging integrated circuit 484b may be implemented as a part of an integrated power management circuit 484. Accordingly, the first and second charging integrated circuits 484a and 484b for controlling charging of the battery 491 may be provided at the first and second connection lines 482 and 483, respectively.

If the first and second charging integrated circuits 484a and 484b are not provided at the first and second connection lines 482 and 483, respectively, a potential difference may occur at the first and second connection lines 482 and 483. Due to this potential difference, charging may be performed through one connection line having a high voltage of the two connection lines 482 and 483.

The power charging controller 496 may include a control switch 496a provided between the switching unit 497 and the signal generating unit 498. The control switch 496a may be switched (or changed) so as to prevent an OFF signal from being transmitted to the switching unit 497 when a control command is input to the user input unit. For example, the control switch 496a may be switched (or changed) so as to connect or disconnect a signal connection line 485. If a user selects a high-speed charging, the control switch 496a may be switched (or changed) so as to disconnect the signal connection line 485. In this example, a wireless charging is not stopped, but rather may be continuously performed.

Figure 10A:
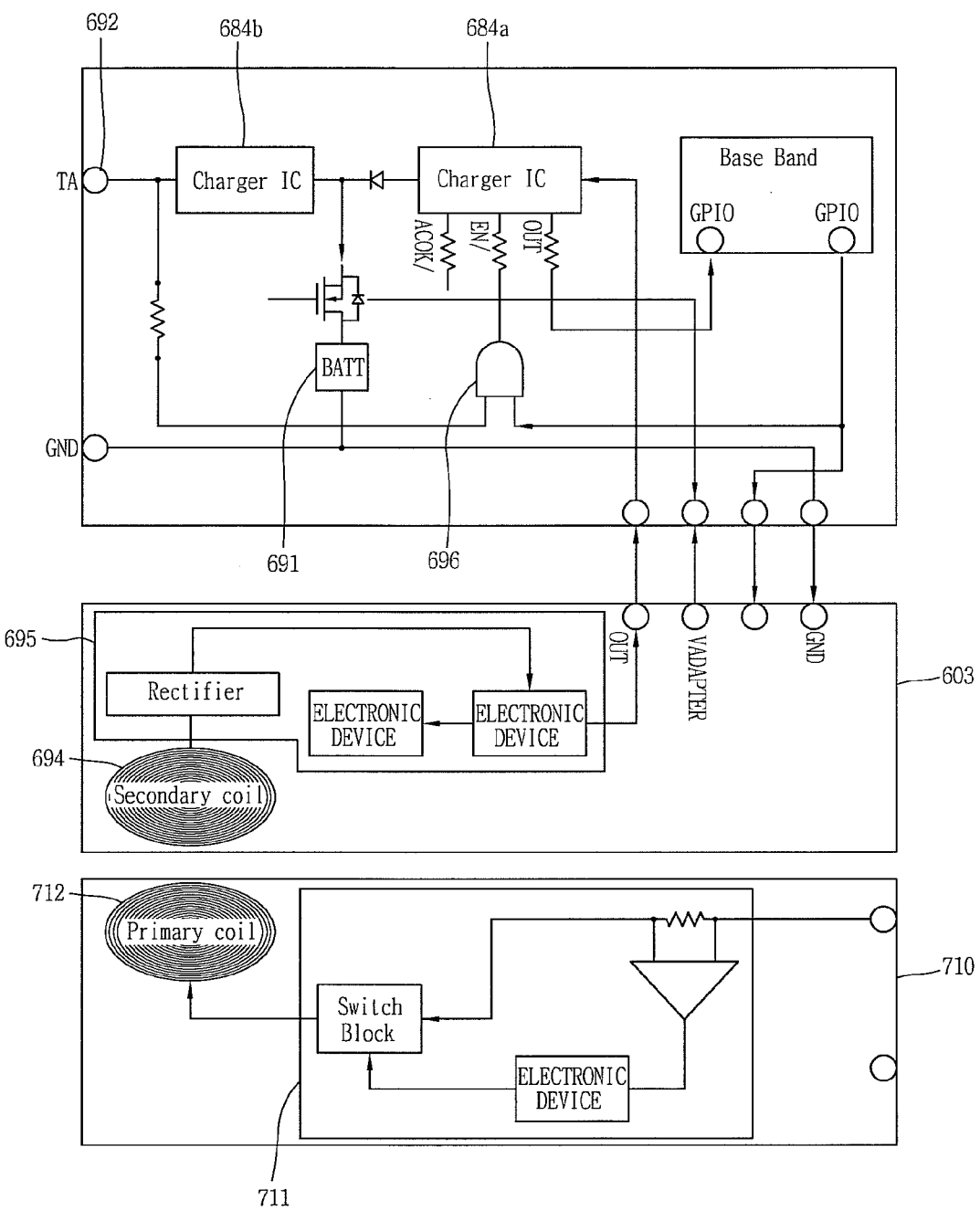
FIGS. 10A and 10B are circuit diagrams of a mobile terminal according to an embodiment.
Figure 10B:
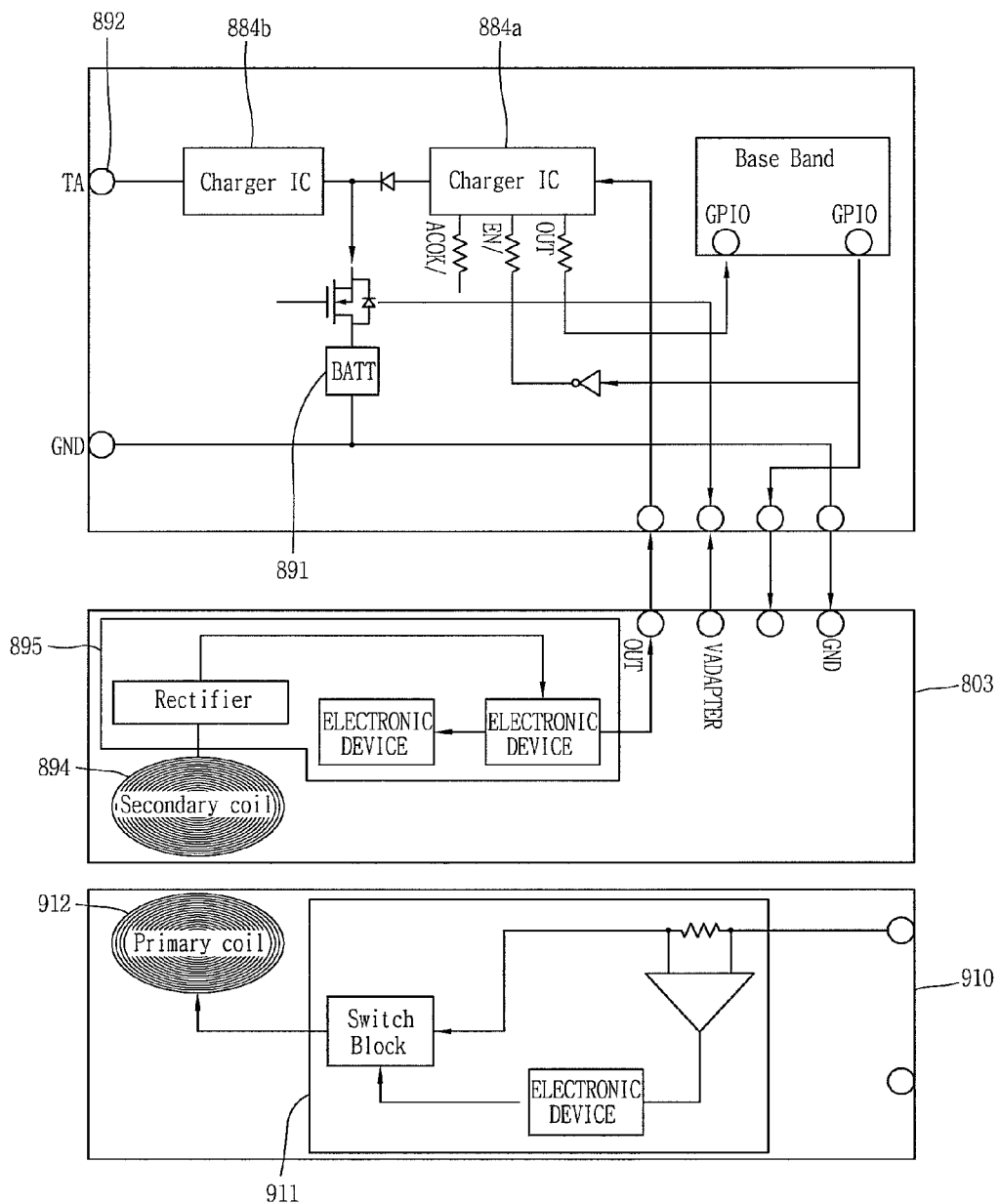

FIGS. 10A and 10B are circuit diagrams of a mobile terminal according to an embodiment. Other embodiments and configurations may also be provided Referring to FIG. 10A, a first charging integrated circuit 684a may be provided between a wireless charger 695 and a battery 691, and the first charging integrated circuit 684a may be turned on or off by a power charging controller 696. Under this configuration, a single charging (by the second charging apparatus) or a simultaneous charging (by the first and second charging apparatuses) may be set.

A second charging integrated circuit 684b may be provided between a connection port 692 and the battery 691. The second charging integrated circuit 684b may control charging of the battery 691.

The power charging controller 696 may be electrically connected to the connection port 692, and may control the first charging integrated circuit 684a on or off by detecting power supplied from the connection port 692.

The power charging controller 696 may transmit an ON signal or an OFF signal to the first charging integrated circuit 684a based on a user's setting and whether a power supply through the connection port 692 has been performed. The following combinations may be implemented.

| TA | Turbo Control | Wireless Charger | /EN signal |
|---|---|---|---|
| No | don't care | On | Low |
| No | don't care | On | Low |
| Yes | No | Off | High |
| Yes | Yes | On | Low |

According to the combinations, once a user selects a simultaneous charging, the first charging integrated circuit 684a may operate. As a result, a high-speed charging may be performed.

As shown in FIG. 10A, a cover 603 may include the wireless charger 69 and a secondary coil 694. A first charging apparatus 710 may include an AC generator 711 and a primary coil 712.

FIG. 10B is a circuit for setting a simultaneous charging. Referring to FIG. 10B, an operation of a first charging integrated circuit 884a may be controlled by applying a signal to a General Purpose Input Output (GPIO) in a reverse manner.

FIG. 10B also shows the first charging integrated circuit 884a provided between a wireless charger 895 and a battery 891. A second charging integrated circuit 884b may be provided between a connection port 892 and the battery 891.

A cover 803 may include a wireless charger 895 and a secondary coil 894. A first charging apparatus 910 may include an AC generator 911 and a primary coil 912.

Embodiments may have advantages.

A mobile terminal may provide a priority to a wired charging by disconnecting an electrical connected status of a wireless charging by a power charging controller when power is supplied through the wired charging apparatus.

The mobile terminal may detect, through a delay circuit, that the power supply terminal of the wired charging apparatus has been connected thereto during a wireless charging. This may allow a wireless charging to be maintained when the data supply terminal is connected to the mobile terminal.

The mobile terminal may perform, through a plurality of charging integrated circuits, both a single charging by the wired charging apparatus, and a simultaneous charging by the wired charging apparatus and the wireless charging apparatus. One of the single charging and the simultaneous charging may be set by a user's selection. This may enhance a user's convenience.

A charging mechanism capable of charging a mobile terminal may be provided based on priorities.

A mobile terminal may be provided that is capable of being charged more rapidly and with more reliability.

A mobile terminal may include a body having a battery and configured to be mountable to a first charging apparatus. A current generator may be mounted to the body and may be configured to generate an induction current by using a current of the first charging apparatus. A wireless charger may be disposed between the current generator and the battery and may be configured to charge the battery by converting the induction current into a direct current. The mobile terminal may also include a connection port disposed on one surface of the body, electrically connected to the battery and to which a power supply terminal of the second charging apparatus is connectable. A power charging controller may disconnect an electrical connected status between the wireless charger and the battery when the power supply terminal is connected to the connection port.

The power charging controller may include a switching unit to switch on/off a first connection line between the wireless charger and the battery, and a signal generating unit disposed on a second connection line between the connection port and the battery, and configured to transmit an OFF signal to the switching unit when the power supply terminal is connected to the connection port.

A user input unit for inputting a control command may be provided on a surface of the body. The power charging controller may be turned on/off by the control command such that the mobile terminal is simultaneously charged by the first and second charging apparatuses.

An accommodation space for accommodating the battery may be formed on a surface of the body. A cover for covering the accommodation space may be mounted to the body. One of the current generator and the wireless charger may be formed at the cover.

A mobile terminal may also include a body having a battery and configured to be mountable to a first charging apparatus. A current generator may be mounted to the body and may be configured to generate an induction current by using a current of the first charging apparatus. A wireless charger may be disposed between the current generator and the battery and may be configured to charge the battery by converting the induction current into a direct current. The mobile terminal may also include a first charging integrated circuit disposed between the wireless charger and the battery and may be configured to control charging of the battery. A connection port may be mounted to the body, and may be electrically connected to the battery and to which a power supply terminal of the second charging apparatus is connectable. A power charging controller may be configured to control on/off of the first charging integrated circuit such that either a single charging by the second charging apparatus or a simultaneous charging by the first and second charging apparatuses is set.

A mobile terminal may include a body having a battery and configured to be mountable to a first charging apparatus. A current generator may be mounted to the body and may be configured to generate an induction current by using a current of the first charging apparatus. A wireless charger may be disposed between the current generator and the battery and may be configured to charge the battery by converting the induction current into a direct current. The mobile terminal may also include a connection port disposed on one surface of the body, electrically connected to the battery and to which a power supply terminal and a data supply terminal are connectable. A power charging controller may disconnect an electrical connected status of the wireless charger to the battery when the power supply terminal is connected to the connection port, but may maintain the electrical connected status of the wireless charger to the battery when the data supply terminal is connected to the connection port.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
   a body including a battery and to be provided on a wireless charging apparatus;
   a current generator provided in the body to generate an induction current based on a current of the wireless charging apparatus;
   a connection port mounted at the body, the connection port to electrically connect to the battery, and the connection port being connectable to a power supply terminal; and
   a power charging controller to perform one of a plurality of charging operations, wherein the plurality of charging operations include a first charging operation using the connection port, a second charging operation using the current generator, and a third charging operation for a higher speed charging than the first charging operation.

2. The mobile terminal of claim 1, wherein the first charging operation corresponds to wireless charging performed when the body is positioned on the wireless charging apparatus, and
   wherein the second charging operation corresponds to wired charging performed when the power supply terminal is electrically connected to the connection port.

3. The mobile terminal of claim 2, wherein the wired charging is performed and the wireless charging is not performed when the power supply terminal is electrically connected to the connection port and the body is positioned on the wireless charging apparatus.

4. The mobile terminal of claim 3, wherein the power charging controller is configured to electrically disconnect a connection of the wireless charger to the battery when the power supply terminal is electrically connected to the connection port.

5. The mobile terminal of claim 1, wherein the plurality of charging operations are performed with different charging speeds.

6. The mobile terminal of claim 1, wherein the third charging operation is performed when the power supply terminal is electrically connected to the connection port and the body is positioned on the wireless charging apparatus.

7. The mobile terminal of claim 1, wherein whether the third charging operation is performed or not is set by a user's selection.

8. The mobile terminal of claim 7, wherein a selection window displays visual information for informing high-speed charging and the user's selection.

9. The mobile terminal of claim 1, further comprising:
   a wireless charger converting the induction current into a direct current; and
   a charging integrated circuit disposed between the wireless charger and the battery, and the charging integrated circuit configured to control charging of the battery.

10. The mobile terminal of claim 9, wherein the power charging controller is configured to transmit an ON signal or an OFF signal to the charging integrated circuit, based on whether the power supply terminal has been connected to the connection port.

* * * * *